ent Office 3,264,180
Patented August 2, 1966

3,264,180
METHOD FOR CONTROLLING PESTS
Fritz Bachmann, Riehen, Switzerland, assignor to Ciba Limited, Basel, Switzerland, a company of Switzerland
No Drawing. Filed June 8, 1965, Ser. No. 462,400
Claims priority, application Switzerland, June 18, 1964, 8,019/64
1 Claim. (Cl. 167—33)

The present invention provides a preparation for combating insects that are injurious to cotton plants, especially Prodenia, Earias and Heliothis, said preparation containing as active substance the compound of the formula

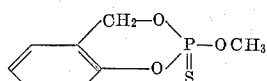

and, if desired, one or several of the following additives: solid vehicles, solvents, stabilizers, dispersants and/or adhesives.

It is known to the expert that in the class of insecticidal organic phosphoric acid esters and thiophosphoric acid esters a useful action against cotton pests, especially those of the family of the Noctuidae, cannot be predicted even if the active substance concerned is very effective against other insects. Thus, for example, the known insecticides of the formulae

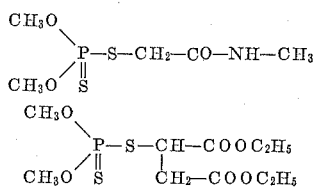

and

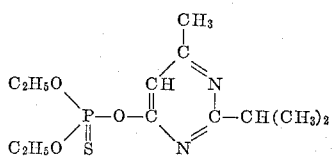

can be used with good results against Lepidoptera larvae but not against the Noctuidae, such as Prodenia, Earias and Heliothis, which damage cotton plants. However, the new preparations of this invention are specially effective against these particular pests.

Furthermore, in the case of the insecticidal organic phosphorus compounds it can in general not be predicted whether they will produce phytotoxic effects on the type of plant to be treated or not. This is particularly true in the case of the treatment of cotton cultures; in this particular instance numerous insecticides had to be excluded from practical application because they damaged the plants.

The new preparations, on the other hand, display an unexpectedly strong action against cotton plants without producing phytotoxic effects on the treated plants.

Moreover, the new preparations are distinguished by their very favourable sustained action and stability.

The new preparations act against the afore-mentioned cotton pests in their different stages of development, such as ovae, larvae and imagines, both as contact and stomach poisons.

The emulsifier or dispersant which may be incorporated with the new preparations as a further constituent may be a non-ionic product, e.g. a condensation product of an aliphatic alcohol, amine or carboxylic acid containing a long-chain hydrocarbon radical of about 10 to 30 carbon atoms with ethylene oxide, such as the condensation product of octadecyl alcohol with 25 to 30 mols of ethylene oxide, or of commercial oleylamine with 15 mols of ethylene oxide, or of dodecylmercaptan with 12 mols of ethylene oxide. As suitable anionic emulsifiers there may be mentioned the sodium salt of dodecyl alcohol-sulfuric acid ester, the sodium salt of dodecylbenzene-sulfonic acid, the sodium or triethanolamine salt of oleic or abietic acid or of mixtures of these two acids, or the sodium salt of a petroleum-sulfonic acid. Suitable kationic dispersants are quaternary ammonium compounds such as cetyl pyridinium bromide or dihydroxyethyl benzyl dodecyl ammonium bromide or dihydroxyethyl benzyl dodecyl ammonium chloride.

For the manufacture of the new preparations in the form of casting or dusting agents there may be added as further constituents solid vehicles such as talcum, kaolin, bentonite, cork meal, wood meal and other materials of vegetable origin. It is also very advantageous to manufacture the preparations in granular form. The various forms of application of the new preparations for use in general pest control may contain the usual additives capable of improving the distribution, adhesion, stability towards rain or the penetration; as such substances there may be mentioned fatty acids, resins, glue, casein or e.g., alginates.

Percentages in the following examples are by weight.

*Example 1*

Aqueous spray broths were prepared from a spray concentrate consisting of—

20% of the compound of the formula

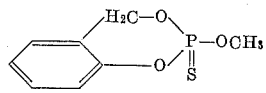

50% of xylene and
30% of an emulsifier consisting of 7 parts of the calcium salt of mono-laurylbenzene-monosulfonic acid and 3 parts of a polyethyleneglycol ether of sorbitan-monolaurate.

*Example 2*

(a) *Stomach poison effect.*—Cotton plants were treated with the spray broths of Example 1 and after the spray had dried, Prodenia in the second larval stage (6 days old) were fed leaves from these plants. The effects achieved are shown in the following table:

| Concentration of active substance, percent | Effect ½ hour after infestation, percent | Reinfestation 18 hours after spraying, percent | Reinfestation 96 hours after spraying, percent |
|---|---|---|---|
| 0.08 | 100 | 100 | 90 |
| 0.04 | 100 | 100 | 100 |
| 0.02 | ---------- | 100 | 100 |

In another test a spray broth having a concentration of 0.01% of active substance was used and after 24 hours a 100% effect was observed.

No phytotoxic effects were found on the cotton plants treated.

(b) *Contact poison effect.*—Petri dishes were sprayed on the inside with spray broths described in Example 1 (concentration of active substance 0.04, 0.02 and 0.01%) and normally fed Prodenia larvae (6 to 17 days old) were placed in the dishes. The check carried out 3½ hours after the larvae had been introduced in the Petri dishes revealed that every one of the concentrations used left all stages of the larvae either dead or moribund.

Results similar to those described under (a) and (b)

above are obtained when Heliothis or Earias are used as test organisms.

What is claimed is:

The method for combating insects that are harmful to cotton plants, wherein there is applied to the area where said effect is desired, an insecticidal amount of the compound of the formula

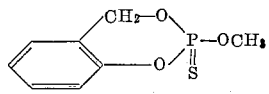

References Cited by the Examiner

UNITED STATES PATENTS 2,758,954  8/1956  Tidwell _____ 167—30

OTHER REFERENCES

Eto: Chem. Abstracts, 59 (1963), 3269F, P.O.S.L.

JULIAN S. LEVITT, *Primary Examiner.*

STANLEY J. FRIEDMAN, *Assistant Examiner.*